(12) United States Patent
Klostermann et al.

(10) Patent No.: US 10,023,679 B2
(45) Date of Patent: Jul. 17, 2018

(54) COMPOSITION WHICH IS SUITABLE FOR PRODUCING POLYURETHANE FOAMS AND CONTAINS AT LEAST ONE HFO BLOWING AGENT

(71) Applicant: Evonik Degussa GmbH, Essen (DE)

(72) Inventors: Michael Klostermann, Essen (DE); Joachim Venzmer, Essen (DE); Christian Eilbracht, Herne (DE); Martin Glos, Borken (DE); Carsten Schiller, Ratingen (DE)

(73) Assignee: EVONIK DEGUSSA GMBH, Essen (DE)

( * ) Notice: Subject to any disclaimer, the term of this patent is extended or adjusted under 35 U.S.C. 154(b) by 46 days.

(21) Appl. No.: 15/103,015

(22) PCT Filed: Dec. 5, 2014

(86) PCT No.: PCT/EP2014/076712
§ 371 (c)(1),
(2) Date: Jun. 9, 2016

(87) PCT Pub. No.: WO2015/091021
PCT Pub. Date: Jun. 25, 2015

(65) Prior Publication Data
US 2016/0311961 A1 Oct. 27, 2016

(30) Foreign Application Priority Data
Dec. 19, 2013 (DE) .................. 10 2013 226 575

(51) Int. Cl.
| | | |
|---|---|---|
| *C08G 18/08* | (2006.01) |
| *C08J 9/00* | (2006.01) |
| *C08J 9/14* | (2006.01) |
| *C08G 18/16* | (2006.01) |
| *C08G 18/18* | (2006.01) |
| *C08G 18/22* | (2006.01) |
| *C08G 18/48* | (2006.01) |
| *F16L 59/02* | (2006.01) |
| *C08G 101/00* | (2006.01) |

(52) U.S. Cl.
CPC ........... *C08G 18/14* (2013.01); *C08G 18/163* (2013.01); *C08G 18/18* (2013.01); *C08G 18/225* (2013.01); *C08G 18/4804* (2013.01); *C08J 9/0004* (2013.01); *C08J 9/0061* (2013.01); *C08J 9/144* (2013.01); *C08J 9/146* (2013.01); *F16L 59/028* (2013.01); *C08G 2101/00* (2013.01); *C08J 2201/022* (2013.01); *C08J 2203/142* (2013.01); *C08J 2203/162* (2013.01); *C08J 2205/052* (2013.01); *C08J 2205/10* (2013.01); *C08J 2375/08* (2013.01); *C08J 2483/12* (2013.01)

(58) Field of Classification Search
CPC ...... C08G 18/14; C08G 18/163; C08G 18/18; C08G 18/225; C08G 18/4804; C08G 2101/00; C08J 9/0004; C08J 9/0061; C08J 9/144; C08J 9/146; C08J 2201/022; C08J 2203/142; C08J 2203/162; C08J 2205/052; C08J 2205/10; C08J 2375/08; C08J 2483/12; F16L 59/028
See application file for complete search history.

(56) References Cited

U.S. PATENT DOCUMENTS

| | | |
|---|---|---|
| 3,578,612 A | 5/1971 | Burba et al. |
| 3,933,695 A | 1/1976 | Omietanski et al. |
| 4,042,540 A | 8/1977 | Lammerting et al. |
| 4,147,847 A | 4/1979 | Schweiger |
| 4,855,379 A | 8/1989 | Budnik et al. |
| 5,306,737 A | 4/1994 | Burkhart et al. |
| 5,321,051 A | 6/1994 | Baurkhart et al. |
| 5,357,018 A | 10/1994 | Burkhart et al. |

(Continued)

FOREIGN PATENT DOCUMENTS

| | | |
|---|---|---|
| DE | 1745443 | 5/1957 |
| DE | 1802500 | 12/1959 |

(Continued)

OTHER PUBLICATIONS

German language Examination Report dated Jul. 15, 2014 in DE 10 2013 226 575.1 (5 pages).

(Continued)

*Primary Examiner* — John Cooney
(74) *Attorney, Agent, or Firm* — Nexsen Pruet, PLLC; Philip P. McCann

(57) ABSTRACT

The present invention relates to compositions which are suitable for producing polyurethane foams and contain at least one polyol component, at least one blowing agent, a catalyst which catalyzes the formation of a urethane or isocyanurate bond, a silicon-containing foam stabilizer and optionally further additives and optionally an isocyanate component, characterized in that they contain at least one unsaturated halogenated hydrocarbon as blowing agent and additionally at least one surfactant TD which does not have a silicon atom and has an HLB of less than 10, where the proportion of the sum of the surfactants TD in the composition is from 0.05 to 20 parts by mass per 100 parts by mass of polyol components, a process for producing polyurethane and polyisocyanurate foams, in particular rigid foams, starting out from these polyol compositions, the use of the foams, in particular as insulation material, and also the insulation materials themselves.

14 Claims, No Drawings

(56) References Cited

U.S. PATENT DOCUMENTS

| | | |
|---|---|---|
| 5,990,187 A | 11/1999 | Boinowitz et al. |
| 6,359,022 B1 | 3/2002 | Hickey et al. |
| 6,472,446 B1 | 10/2002 | Riley et al. |
| 7,671,103 B2 | 3/2010 | Eilbracht et al. |
| 7,838,566 B2 | 11/2010 | Glos et al. |
| 8,030,366 B2 | 10/2011 | Ferenz et al. |
| 8,247,525 B2 | 8/2012 | Schubert et al. |
| 8,303,843 B2 | 11/2012 | Glos et al. |
| 8,334,355 B2 | 12/2012 | Henning et al. |
| 8,439,907 B2 | 1/2013 | Henning et al. |
| 8,623,984 B2 | 1/2014 | Henning et al. |
| 8,735,458 B2 | 5/2014 | Glos et al. |
| 8,906,914 B2 | 12/2014 | Glos et al. |
| 8,912,277 B2 | 12/2014 | Glos |
| 8,946,310 B2 | 2/2015 | Glos et al. |
| 8,946,311 B2 | 2/2015 | Schiller et al. |
| 8,957,121 B2 | 2/2015 | Schiller et al. |
| 9,056,952 B2 | 6/2015 | Eilbracht et al. |
| 9,126,163 B2 | 9/2015 | Giessler-Blank et al. |
| 9,175,126 B2 | 11/2015 | Albrecht et al. |
| 2002/0103091 A1 | 8/2002 | Kodali |
| 2004/0014927 A1* | 1/2004 | Watanabe ............ C08G 18/222 528/44 |
| 2006/0167125 A1 | 7/2006 | Bauer et al. |
| 2007/0021581 A1 | 1/2007 | Eilbracht et al. |
| 2007/0072951 A1 | 3/2007 | Bender et al. |
| 2007/0123599 A1 | 5/2007 | Eilbracht et al. |
| 2007/0238800 A1 | 10/2007 | Neal et al. |
| 2007/0270518 A1 | 11/2007 | Nutzel |
| 2007/0282026 A1 | 12/2007 | Grigsby et al. |
| 2008/0071497 A1 | 3/2008 | Todd |
| 2008/0125503 A1 | 5/2008 | Henning et al. |
| 2008/0234402 A1 | 9/2008 | Lehmann et al. |
| 2009/0088488 A1 | 4/2009 | Bruckner et al. |
| 2009/0099273 A1* | 4/2009 | Williams ............ C08G 18/1816 521/94 |
| 2009/0305875 A1 | 12/2009 | Denifl et al. |
| 2010/0029587 A1 | 2/2010 | Brueckner et al. |
| 2010/0036011 A1 | 2/2010 | De Gans et al. |
| 2010/0240786 A1 | 9/2010 | Glos et al. |
| 2011/0054055 A1 | 3/2011 | Schmitz et al. |
| 2011/0062370 A1 | 3/2011 | Eilbracht et al. |
| 2011/0257280 A1 | 10/2011 | Glos et al. |
| 2011/0306694 A1 | 12/2011 | Glos et al. |
| 2012/0031868 A1 | 2/2012 | Willim |
| 2012/0034753 A1 | 2/2012 | Bhat et al. |
| 2012/0037036 A1 | 2/2012 | Veit et al. |
| 2012/0153210 A1 | 6/2012 | Glos et al. |
| 2012/0190760 A1 | 7/2012 | Henning et al. |
| 2012/0190762 A1 | 7/2012 | Hubel et al. |
| 2012/0264843 A1 | 10/2012 | Glos |
| 2013/0035407 A1 | 2/2013 | Lobert et al. |
| 2013/0068990 A1 | 3/2013 | Eilbracht et al. |
| 2013/0156237 A1 | 6/2013 | Kim |
| 2013/0310530 A1 | 11/2013 | Jha et al. |
| 2014/0100314 A1 | 4/2014 | Glos et al. |
| 2014/0202339 A1 | 7/2014 | Cole et al. |
| 2015/0028295 A1 | 1/2015 | Choi |
| 2015/0057384 A1 | 2/2015 | Glos et al. |
| 2015/0091021 A1 | 4/2015 | Yoshie |
| 2015/0091801 A1 | 4/2015 | Asbjornsen et al. |
| 2015/0101497 A1 | 4/2015 | Sagmanli |
| 2015/0329752 A1 | 11/2015 | Albrecht et al. |
| 2015/0368420 A1 | 12/2015 | Schmitz et al. |
| 2016/0020137 A1 | 1/2016 | Halpin |
| 2016/0020138 A1 | 1/2016 | Chang et al. |
| 2016/0020139 A1 | 1/2016 | Teng et al. |
| 2016/0020140 A1 | 1/2016 | Ryan |
| 2016/0020199 A1 | 1/2016 | Fu et al. |
| 2016/0020200 A1 | 1/2016 | Risaki |
| 2016/0020201 A1 | 1/2016 | Butendeich et al. |

FOREIGN PATENT DOCUMENTS

| | | |
|---|---|---|
| DE | 1802503 | 12/1959 |
| DE | 1745459 A1 | 9/1971 |
| DE | 2533074 A1 | 3/1976 |
| DE | 4229402 A1 | 3/1994 |
| DE | 4239054 A1 | 5/1994 |
| DE | 102004001408 A1 | 7/2005 |
| EP | 0493836 A1 | 7/1992 |
| EP | 533202 A1 | 3/1993 |
| EP | 0767199 A1 | 4/1997 |
| EP | 0780414 A2 | 6/1997 |
| EP | 0839852 A2 | 5/1998 |
| EP | 0656382 B1 | 8/1998 |
| EP | 867464 A1 | 9/1998 |
| EP | 1161474 A1 | 12/2001 |
| EP | 1520873 A2 | 4/2005 |
| EP | 1537159 A1 | 6/2005 |
| EP | 1544235 A1 | 6/2005 |
| EP | 1678232 A2 | 7/2006 |
| EP | 1712578 A1 | 10/2006 |
| EP | 1873209 A2 | 1/2008 |
| EP | 1977825 A1 | 10/2008 |
| EP | 1985642 A1 | 10/2008 |
| EP | 1985644 A1 | 10/2008 |
| EP | 2154223 A1 | 2/2010 |
| EP | 2197935 B1 | 8/2013 |
| WO | 9612759 A2 | 5/1996 |
| WO | 9842764 A1 | 10/1998 |
| WO | 0047647 A1 | 8/2000 |
| WO | 2004020497 A1 | 3/2004 |
| WO | 2004096882 A1 | 11/2004 |
| WO | 2005033167 A2 | 4/2005 |
| WO | 2005085310 A2 | 9/2005 |
| WO | 2005118668 A1 | 12/2005 |
| WO | 2006094227 A2 | 9/2006 |
| WO | 2006116456 A1 | 11/2006 |
| WO | 2007094780 A1 | 8/2007 |
| WO | 2007111828 A2 | 10/2007 |
| WO | 2009/048826 A2 | 4/2009 |
| WO | 2009048802 A2 | 4/2009 |
| WO | 2013026813 A1 | 2/2013 |

OTHER PUBLICATIONS

German language International Search Report dated Mar. 10, 2015 in PCT/EP2014/076712 (4 pages).
German language Written Opinion dated Mar. 10, 2015 in PCT/EP2014/076712 (6 pages).
International Search Report dated Mar. 10, 2015 in PCT/EP2014/076712 (2 pages).

* cited by examiner

COMPOSITION WHICH IS SUITABLE FOR PRODUCING POLYURETHANE FOAMS AND CONTAINS AT LEAST ONE HFO BLOWING AGENT

This application is a national stage application under 35 U.S.C. § 371 of International Application No. PCT/EP2014/076712 filed 5 Dec. 2014, which claims priority to German Application No. DE 10 2013 226 575.1 filed 19 Dec. 2013, the disclosures of which are expressly incorporated herein by reference.

FIELD

The present invention relates to compositions which are suitable for producing polyurethane foams and contain at least one polyol component, at least one blowing agent, a catalyst which catalyzes the formation of a urethane or isocyanurate bond, a silicon-containing foam stabilizer and optionally further additives and optionally an isocyanate component, characterized in that they contain at least one unsaturated chlorofluorohydrocarbon or fluorinated hydrocarbon and additionally at least one surfactant TD which does not have a silicon atom and has an HLB of less than 10, preferably less than 7, particularly preferably less than 6, where the proportion of the sum of the surfactants TD in the composition is from 0.05 to 20 parts by mass per 100 parts by mass of polyol component, a process for producing polyurethane and polyisocyanurate foams, in particular rigid foams, starting out from these polyol compositions, the use of the foams, in particular as insulation material, and also the insulation materials themselves.

BACKGROUND

The production of polyurethane or polyisocyanurate foams by foaming foamable reaction mixtures based on polyisocyanates, compounds having reactive hydrogen atoms, blowing agents, stabilizers and optionally further additives is operated on a large industrial scale today. An important field of use of these foams is insulation, in particular thermal insulation. To produce insulating foams, it is necessary to produce rigid foams having a relatively low foam density of <50 kg/m$^3$ and, as an essential criterion, a very large number of small closed cells (high cell density).

A blowing gas is necessary for such a foam to be able to form. Conventional blowing agents here are hydrocarbons, (partially) halogenated saturated and unsaturated hydrocarbons and also substances which generate $CO_2$.

Apart from the capability of forming many small, homogeneous closed cells during foaming, preferred blowing agents have a low gas-phase thermal conductivity and also a low Global Warming Potential (GWP). In this context, unsaturated halogenated hydrocarbons, known as HFO blowing agents, have been able to be identified as particularly effective blowing agents. The use of HFO blowing agents for producing polyurethane foams is, for example, described in the documents EP 2154223 A1, EP 2197 935 B1 and US 2009/0305875 A1.

Despite the demonstrated effectiveness of unsaturated halogenated hydrocarbons as blowing agents, a disadvantage of these substances is that they are often only insufficiently miscible with the polyurethane system to be foamed or with the basic raw materials used for PU foam production. This leads to mixtures of this type having only a low storage stability and frequently tending to undergo phase separation into two or more phases, which can lead, inter alia, to defects in the PU foam obtained.

Particular importance is attached to the separation stability of the polyurethane systems or polyol mixtures when using preformulated polyurethane systems in the production of insulation materials for cooling appliances (refrigerators and upright freezers or freezer chests). Here, it is customary to mix the blowing agent before foaming with the so called A component which consists of, in addition to the blowing agent, one or more polyols, one or more catalysts, foam stabilizers, water, optionally flame retardants and optionally further additives and auxiliaries. This is mixed during foaming with the so called B component, which generally consists of an isocyanate, usually polymeric MDI, to which no additives have been added, and foamed. To make a trouble-free foaming process possible, it is necessary for the A component to have a sufficient separation stability so that no undesirable demixing phenomena which could lead, as described above, to foam defects occurring during foaming.

In addition, a trouble-free production process can be ensured by a sufficient storage stability of a preformulated A component in a large-scale industrial foaming process. In this way, it is possible, for example in the case of relatively long plant downtimes, e.g. during maintenance work or over the weekend, to avoid separation of the system in lines and stock vessels which would inevitably lead to severe foam defects when the plant is started up again.

It was therefore an object of the present invention to provide a composition containing at least one polyol component, at least one blowing agent which is characterized in that it is an unsaturated halogenated hydrocarbon, a catalyst which catalyzes the formation of a urethane or isocyanurate bond and optionally further additives, where the composition is characterized in that it is separation-stable for at least three days.

To achieve solubilization between polyol systems and blowing agents, the use of various surfactants has been proposed in the past.

WO 2007/094780 describes polyol mixtures containing hydrocarbons as blowing agents, with an ethoxylate-propoxylate surfactant being added to the mixtures to improve the solubility of the blowing agent in the mixture.

U.S. Pat. No. 6,472,446 describes polyol mixtures containing hydrocarbons as blowing agents, where a butanol-initiated propylene oxide polyether surfactant is added to the mixtures to improve the solubility of the blowing agent in the mixture.

WO 98/42764 likewise describes polyol mixtures containing hydrocarbons as blowing agents, where a C12-C15-initiated polyether is added as surfactant to the mixtures in order to improve the solubility of the blowing agent in the mixture.

WO 96/12759 likewise describes polyol mixtures containing hydrocarbons as blowing agents, where a surfactant which has an alkyl radical having at least 5 carbon atoms is added to the mixtures to improve the solubility of the blowing agent in the mixture.

EP 0767199 A1 describes the use of diethanolamides of fatty acids of natural origin as surfactant for producing polyol mixtures which have hydrocarbons as blowing agents.

EP 1520873 A2 describes mixtures of halogenated hydrocarbon blowing agents and blowing agent reinforcers which have a molecular weight of less than 500 g/mol, with the blowing agent reinforcers being able to be polyethers or monoalcohols such as ethanol, propanol, butanol, hexanol, nonanol or decanol. The ratio of blowing agent to blowing agent reinforcer is said to be 60-95% by mass: 40-5% by mass. However, the halogenated hydrocarbons used are not HFO blowing agents. In addition, this document does not disclose whether the blowing agent reinforcers used lead to compatibilization of the blowing agent in polyols.

WO 2013/026813 describes microemulsions of polyols and nonpolar organic compounds, which are obtained by use of at least one halogen-free compound which contains at least one amphiphilic compound selected from among non-ionic surfactants, polymers and mixtures thereof and at least one compound different from this compound, and their use in the production of polyurethanes. The nonpolar compounds used can also contain proportions of fluorinated compounds. Polyol-based microemulsions which contain exclusively halogenated nonpolar compounds are not described in this document.

Since the dissolution properties of halogenated hydrocarbons differ fundamentally from those of nonfluorinated hydrocarbons, it is not possible to apply the additives proposed for hydrocarbon-based blowing agent to the present problem.

SUMMARY

It has surprisingly been found that separation-stable compositions composed of polyol(s), additives and HFO blowing agents can be provided when a surfactant having an HLB of less than 10, preferably less than 7, particularly preferably less than 6, is additionally added to the mixture.

DETAILED DESCRIPTION

The HLB is usually used for selecting emulsifiers for the production of oil-water emulsions. It was therefore not possible to foresee that such a value is also suitable for selecting surfactants for polyol systems which are not based on water. The HLB of a surfactant can here be calculated by the incremental method of Griffin (W. C. Griffin, *J. Cos. Cosmet. Chem.*, 1950, 311:5, 249) and McGowan (J. C. McGowan, *Tenside Surfactants Detergents*, 1990, 27, 229). According to this method, the HLB of a molecule is made up of individual increments of its molecular building blocks, as per Equation 1.

$$HLB = 7 + \Sigma H_h \Sigma H_l \quad (eq. 1)$$

$H_h$ and $H_l$ are the HLB group numbers of the individual hydrophilic and lipophilic molecular building blocks. Typical values for $H_h$ and $H_l$ are listed in Table 1.

TABLE 1

HLB group numbers of various molecular building blocks (see also Table 3 in R. Sowada and J. C. McGowan, *Tenside Surfactants Detergents*, 1992, 29, 109)

| | Molecular building blocks | HLB group number |
|---|---|---|
| $H_h$ | —O— (ether) | 1.3 |
| | —OH (free) | 1.12 |
| | —COOH (free) | 2.09 |
| | —COO— (ester) | 2.28 |
| | —CONH—R (amide) | 2.136 |
| | —CON—R$_2$ (amide) | 2.319 |
| | —NH$_2$ (free) | 8.59 |
| | —(CH$_2$CH$_2$O)— | 0.353 |
| $H_l$ | —CH$_3$ | −0.658 |
| | —CH$_2$—R | −0.457 |

TABLE 1-continued

HLB group numbers of various molecular building blocks (see also Table 3 in R. Sowada and J. C. McGowan, *Tenside Surfactants Detergents*, 1992, 29, 109)

| Molecular building blocks | HLB group number |
|---|---|
| —CH—R$_2$ | −0.295 |
| —CH= | −0.402 |

The present invention accordingly provides compositions which are suitable for producing polyurethane foams and contain at least one polyol component, at least one blowing agent, a catalyst which catalyzes the formation of a urethane or isocyanurate bond, a silicon-containing foam stabilizer and optionally further additives and optionally an isocyanate component, which are characterized in that they contain at least one unsaturated chlorofluorohydrocarbon or unsaturated fluorinated hydrocarbon as blowing agent and additionally at least one surfactant TD which does not have a silicon atom and has an HLB of less than 10, preferably less than 7, particularly preferably less than 6, where the concentration of the surfactant TD in the composition is from 0.05 to 20% by weight, based on the total composition.

The present invention likewise provides a process for producing polyurethane or polyisocyanurate foams, in particular rigid foams, starting out from these polyol compositions, the use of the foams, in particular as insulation materials, and also the insulation materials themselves.

The present invention further provides polyurethane foams which have been produced on the basis of the above-described process.

The compositions of the invention have the advantage that relatively large amounts of HFO blowing agent can be introduced into the compositions without the compositions displaying phase separation perceptible to the naked eye even after a storage time of 72 hours.

A further advantage of the compositions of the invention is that foam stabilizers having a high silicone content can also be used in them without phase separation of the mixture occurring despite the fact that such foam stabilizers would otherwise have an adverse effect on the compatibility of polyol and blowing agent.

The subject-matter of the invention is described hereinafter by way of example, without any intention of limiting the invention to these illustrative embodiments. When ranges, general formulae or compound classes are specified hereinafter, these shall include not just the corresponding ranges or groups of compounds that are explicitly mentioned but also all sub-ranges and sub-groups of compounds which can be obtained by removing individual values (ranges) or compounds. When documents are cited in the context of the present description, the contents thereof, particularly with regard to the subject-matter that forms the context in which the document has been cited, are considered in their entirety to form part of the disclosure-content of the present invention. Unless stated otherwise, percentages are figures in percent by weight. If mean values are reported hereinafter, the values in question are weight averages, unless stated otherwise. When parameters which have been determined by measurement are reported hereinafter, they have been determined at a temperature of 25° C. and a pressure of 101 325 Pa, unless stated otherwise.

For the purposes of the present invention, polyurethane foam (PU foam) is foam which is obtained as reaction product based on isocyanates and polyols or compounds having isocyanate-reactive groups. Apart from the groups which give polyurethane its name, further functional groups such as allophanates, biurets, ureas or isocyanurates can also be formed. For the purposes of the present invention, the term PU foams therefore refers both to polyurethane foams (PUR foams) and polyisocyanurate foams (PIR foams). Preferred polyurethane foams are rigid polyurethane foams.

Unsaturated halogenated hydrocarbons are also referred to as HFOs for the purposes of the present patent application. Halogenated hydrocarbons can have one or more identical or different halogens. Blowing agents based on unsaturated halogenated hydrocarbons are correspondingly referred to as HFO blowing agents.

The composition of the invention which is suitable for producing polyurethane foams and contains at least one polyol component, at least one blowing agent, a catalyst which catalyzes the formation of a urethane or isocyanurate bond, a silicon-containing foam stabilizer and optionally further additives and optionally an isocyanate component, is characterized in that it contains at least one unsaturated halogenated hydrocarbon, preferably an unsaturated chlorofluorohydrocarbon and/or unsaturated fluorinated hydrocarbon as blowing agent and at least one surfactant TD which does not have a silicon atom and has an HLB of less than 10, preferably less than 7, particularly preferably less than 6, where the proportion of the sum of the surfactants TD in the composition is from 0.05 to 20 parts by mass per 100 parts by mass of polyol component.

The compositions of the invention preferably comprise from 0.1 to 15 parts by mass and more preferably from 0.5 to 10 parts by mass of surfactants TD per 100 parts by mass of polyol component.

As surfactant TD, the composition of the invention preferably comprises at least one compound of the formula (I)

R—[C(O)]$_x$—Y     (I)

where x=0 or 1, preferably 0, R is a linear, branched or cyclic, saturated or unsaturated, preferably saturated, hydrocarbon radical having at least 4, preferably from 8 to 30, more preferably from 9 to 20 and particularly preferably from 9 to 18 carbon atoms, and Y=O—R$^1$ or NR$^1$R$^2$ or O—CH$_2$—CH(OR$^3$)—CH$_2$OH, where R$^1$ and R$^2$ are in each case identical or different radicals (C$_n$H$_{2n}$O)$_m$—H, where n=2 to 4, preferably n=2 or 3, particularly preferably n=2, and m=0-15, preferably m=0 or 1-10, particularly preferably m=0 or 1-6, very particularly preferably m=0, and R$^1$ and R$^2$ can be identical or different, and R$^3$=H or R' or C(O)R', where R' is a hydrocarbon radical analogous to the definition of R and can be identical to or different from the radical R.

Particularly preferred surfactants TD are those which have at least one hydrocarbon radical having at least 4 carbon atoms, preferably at least 8 carbon atoms and particularly preferably from 9 to 18 carbon atoms, and have an HLB of less than 10, preferably less than 7, particularly preferably less than 6.

When the composition of the invention comprises a surfactant TD of the formula (I) in which x=0 and Y=O—R$^1$, then the composition preferably contains alcohol alkoxylates based on octanol, nonanol, isononanol, capryl alcohol, decanol, lauryl alcohol, tridecanol, isotridecanol, myristyl alcohol, cetyl alcohol, stearyl alcohol or isostearyl alcohol, particularly preferably ethoxylates of these substances, as surfactant TD. The preparation of corresponding fatty alcohol alkoxylates can be carried out as described in the prior art.

When the composition of the invention comprises a surfactant TD of the formula (I) in which x=0 and Y=O—R$^1$ and m=0, then the composition preferably contains octa-nol, nonanol, in particular isononanol, capryl alcohol, lauryl alcohol, tridecanol, isotridecanol, myristyl alcohol, cetyl alcohol, stearyl alcohol, isostearyl alcohol, tridecanol, decanol, dodecanol or a mixture of these substances, preferably isotridecanol and/or, preferably or, isononanol (3,5,5-trimethyl-1-nonanol), as surfactant TD. Surfactant TD of the formula (I) in which x=0 and Y=O—R$^1$ are preferably ones in which m=0.

When the composition of the invention comprises a surfactant TD of the formula (I) in which x=0 and Y=NR$^1$R$^2$ and m=0, then the composition contains a fatty amine, preferably octylamine, nonylamine, isononylamine, caprylamine, laurylamine, tridecylamine, isotridecylamine, myristylamine, cetylamine, stearylamine or isostearylamine, as surfactant TD. In the case of m and n not being 0, the surfactants TD are particularly preferably ethoxylates of these amines.

When the composition of the invention comprises a surfactant TD of the formula (I) in which x=0 and Y=O—CH$_2$—CH(OR$^3$)—CH$_2$OH, then particular preference is given to glyceryl monoethers and diethers of saturated or unsaturated alcohols such as octanol, nonanol, isononanol, capryl alcohol, lauryl alcohol, tridecanol, isotridecanol, myristyl alcohol, cetyl alcohol, stearyl alcohol or isostearyl alcohol.

When the composition of the invention comprises a surfactant TD of the formula (I) in which x=1 and Y=O—R$^1$, then the composition preferably contains alkoxylates, particularly preferably ethoxylates, of saturated or unsaturated fatty acids having up to 30 carbon atoms, e.g. butyric acid (butanoic acid), caproic acid (hexanoic acid), caprylic acid (octanoic acid), capric acid (decanoic acid), lauric acid (dodecanoic acid), myristic acid (tetradecanoic acid), palmitinic acid (hexadecanoic acid), steric acid (octadecanoic acid), arachidicoic acid (eicosanoic acid), behenic acid (docosanoic acid), lignoceric acid (tetracosanoic acid), palmitoleic acid ((Z)-9-hexadecenoic acid), oleic acid ((Z)-9-hexadecenoic acid), elaidic acid ((E)-9-octadecenoic acid), cis-vaccenic acid ((Z)-11-octadecenoic acid), linoleic acid ((9Z,12Z)-9,12-octadecadienoic acid), alpha-linolenic acid ((9Z,12Z,15Z)-9,12,15-octadecatrienoic acid), gamma-linolenic acid ((6Z,9Z,12Z)-6,9,12-octadecatrienoic acid), di-homo-gamma-linolenoic acid ((8Z,11Z,14Z)-8,11,14-eicosatrienoic acid), arachidonic acid ((5Z,8Z,11Z,14Z)-5,8,11,14-eicosatetraenoic acid), erucic acid ((Z)-13-docosenoic acid), nervonic acid ((Z)-15-tetracosenoic acid), ricinoleic acid, hydroxystearic acid and undecenyloic acid, and also mixtures thereof, as surfactant TD.

When the composition of the invention comprises a surfactant TD of the formula (I) in which x=1 and Y=O—CH$_2$—CH(OR$^3$)—CH$_2$OH, then the composition preferably contains monoglycerides or diglycerides, in particular monoglycerides and diglycerides of straight-chain saturated or unsaturated fatty acids having up to 30 carbon atoms, e.g. butyric acid (butanoic acid), caproic acid (hexanoic acid), caprylic acid (octanoic acid), capric acid (decanoic acid), lauric acid (dodecanoic acid), myristic acid (tetradecanoic acid), palmitic acid (hexadecanoic acid), stearic acid (octadecanoic acid), arachidonic acid (eicosanoic acid), behenic acid (docosanoic acid), lignoceric acid (tetracosanoic acid), palmitolic acid ((Z)-9-hexadecenoic acid), oleic ((Z)-9-hexadecenoic acid), elaidic acid ((E)-9-octadecenoic acid), cis-vaccenic acid ((Z)-11-octadecenoic acid), linoleic acid ((9Z,12Z)-9,12-octadecadienoic acid), alpha-linolenic acid ((9Z,12Z,15Z)-9,12,15-octadecatrienoic acid), gamma-linolenic acid ((6Z,9Z,12Z)-6,9,12-octadecatrienoic acid), di-homo-gamma-linolenic acid ((8Z,11Z,14Z)-8,11,14-eicosatrienoic acid), arachidonic acid ((5Z,8Z,11Z,14Z)-5,8,11,14-eicosatetraenoic acid), erucic acid ((Z)-13-docosenoic acid), nervonic acid ((Z)-15-tetracosenoic acid), ricinoleic acid, hydroxystearic acid and undecenyloic acid, and also mixtures thereof, as surfactant TD.

When the composition of the invention comprises a surfactant TD of the formula (I) in which x=1 and in which Y=NR$^1$R$^2$, then the composition preferably comprises a fatty acid amide of a monoalkanolamine or dialkanolamine, particularly preferably of diisopropanolamine or of diethanolamine, as surfactant TD. Acid amides are obtainable, for example, by the processes known in the prior art, e.g. in DE 1802500; DE 1802503, DE 1745443, DE 1745459 or U.S. Pat. No. 3,578,612. The corresponding carboxylic acids can be used here as raw materials, for example, and amide formation take place by detachment of water. Carboxylic esters, such as methyl esters for example, can similarly be used, in which case methanol is detached. Particular preference is given to using glycerides of naturally occurring fats and oils with the glycerol formed in the amidation being able to remain in the reaction mixture. Likewise, for example in the reaction of triglycerides with amines, diglycerides and monoglycerides can be present in the reaction mixture when the reaction conditions have been selected appropriately. When carboxylic esters are used, appropriate catalysts such as alkoxides which allow amidation under relatively mild conditions compared to the abovementioned elimination of water are optionally used. When higher-functional amines (DETA, AEEA, TRIS) are used, formation of corresponding cyclic amides such as imidazolines or oxazolines can also occur in the preparation of the amides.

If a basic catalyst is used in the amidation, it can be advantageous to carry out a neutralization afterwards using an appropriate amount of organic or inorganic acids. Suitable compounds are known to those skilled in the art.

Particular preference is given to neutralization of the amides prepared by basic catalysis with organic anhydrides of dicarboxylic acids since these can react with the available OH or NH functions and are bound thereby and therefore cannot turn up in the form of free carboxylic acids as emission in the finished foam. In addition, for example, when alkali alkoxides are used in the neutralization, corresponding esters are then formed so that the free alcohols cannot be given off from the system.

Preferred organic anhydrides are cyclic anhydrides such as succinic anhydrides, maleic anhydride, alkylsuccinic anhydrides such as dodecylsuccinic anhydride or polyisobutylenesuccinic anhydride; adducts of maleic anhydride with suitable polyolefins such as polybutadienes, copolymers of maleic anhydride and olefins, styrene-maleic anhydride copolymers, vinyl ether-maleic anhydride copolymers and copolymers in general which contain maleic anhydride as monomer, phthalic anhydride, benzophenonetetracarboxylic dianhydride, pyromellitic dianhydride, itaconic anhydride or similar structures are likewise suitable. Examples of commercially available anhydrides of this type are, for example, Polyvest® grades from Evonik Degussa GmbH or Ricon® MA grades from Sartomer.

All reaction steps can be carried out in bulk or in suitable solvents. When solvents are used, the content of "active substance" can be in the range from 10 to 99% by mass, preferably from 20 to 98% by mass, particularly preferably from 30 to 97% by mass, based on the total composition.

Carboxylic Acids:

For preparing the surfactants of the formula (I) in which x=1, useful carboxylic acids are, for example, monocarboxylic acids, dicarboxylic acids, tricarboxylic acids, tetracarboxylic acids based on aliphatic or aromatic hydrocarbons or derivatives thereof.

Examples of alkyl radicals of the monocarboxylic acids are, for example: methyl, ethyl, propyl, butyl, pentyl, hexyl, heptyl, octyl, nonyl or decyl, and the like, with preference being given to 2-ethylhexanoic acid, nonanoic acid, isononanoic acid.

Examples of alkenyl groups are, for example: ethenyl, propenyl, butenyl, pentenyl, hexenyl, heptenyl, octenyl, nonenyl, decenyl, and the like.

Examples of aromatic acids are, for example: aryl and alkylaryl (alkylaryl is for the present purposes an aryl-substituted alkyl or arylalkyl group), for example: phenyl, alkyl-substituted phenyl, naphthyl, alkyl-substituted naphthyl, tolyl, benzyl, dimethylphenyl, trimethylphenyl, phenylethyl, phenylpropyl, phenylbutyl, propyl-2-phenylethyl, salicyl and the like.

Aromatic dicarboxylic acids can be, for example: isophthalic acid, terephthalic acid or phthalic acid. As aliphatic dicarboxylic acids, it is possible to use, for example: succinic acid, malonic acid, adipic acid, dodeanedicarboxylic acid, maleic acid, fumaric acid, itaconic acid, citraconic acid, mesaconic acid, tartaric acid, maleic acid, malonic acid, glutaric acid, adipic acid, pimelic acid, suberic acid, azelaic acid, sebacic acid, citric acid.

As higher-functional acids, it is possible to use, for example: trimesic acid, pyromellitic acid or benzophenonetetracarboxylic acid.

Preferred acids are straight-chain saturated or unsaturated fatty acids having up to 40 carbon atoms such as, for example, butyric acid (butanoic acid), caproic acid (hexanoic acid), caprylic acid (octanoic acid), capric acid (decanoic acid), lauric acid (dodecanoic acid), myristic acid (tetradecanoic acid), palmitic acid (hexadecanoic acid), stearic acid (octadecanoic acid), arachidic acid (eicosanoic acid), behenic acid (docosanoic acid), lignoceric acid (tetracosanoic acid), palmitoleic acid ((Z)-9-hexadecenoic acid), oleic acid ((Z)-9-hexadecenoic acid), elaidic acid ((E)-9-octadecenoic acid), cis-vaccenic acid ((Z)-11-octadecenic acid), linoleic acid ((9Z,12Z)-9,12-octadecadienoic acid), alpha-linolenic acid ((9Z,12Z,15Z)-9,12,15-octadecatrienoic acid), gamma-linolenic acid ((6Z,9Z,12Z)-6,9,12-octadecatrienoic acid), di-homo-gamma-linolenic acid ((8Z,11Z,14Z)-8,11,14-eicosatrienoic acid), arachidonic acid ((5Z,8Z,11Z,14Z)-5,8,11,14-eicosatetraenoic acid), erucic acid ((Z)-13-docosenoic acid), nervonic acid ((Z)-15-tetracosenoic acid), ricinoleic acid, hydroxystearic acid and undecenylic acid, and also mixtures thereof, for example rapeseed oil acid, soya fatty acid, sunflower fatty acid, peanut fatty acid and tall oil fatty acid. It is further possible to use dimeric and oligomeric fatty acids as formed in the oligomerization of unsaturated fatty acids.

Sources of suitable fatty acids or fatty acid esters, in particular glycerides, can be vegetable or animal fat, oils or waxes. For example, it is possible to use: lard, beef tallow, goose fat, duck fat, chicken fat, horse fat, whale oil, fish oil, palm oil, olive oil, avocado oil, oils from seeds, coconut oil, palm kernel oil, coco butter, cotton seed oil, pumpkin seed oil, maize oil, sunflower oil, wheat germ oil, grapeseed oil, sesame oil, linseed oil, soybean oil, peanut oil, lupin oil, rapeseed oil, mustard oil, castor oil, jatropha oil, walnut oil, jojoba oil, lecithin, e.g. based on soya, rapeseed or sunflowers, bone oil, cattlefoot oil, lanolin, emu oil, deer tallow, marmot oil, mink oil, borrage oil, safflower oil, hemp oil, pumpkin oil, evening primrose oil, tall oil and also carnauba wax, bee's wax, candelilla wax, Ouricuri wax, sugar cane wax, Retamo wax, Caranday wax, raffia wax, esparto wax, alfalfa wax, bamboo wax, hemp wax, Douglas fir wax, cork wax, sisal wax, flax wax, cotton wax, dammar wax, tea wax, coffee wax, rice wax, oleander wax, bee's wax or wool wax.

Amines:

Hydroxylamines which have at least one OH function and are suitable for preparing the compounds of the formula (I) with x=1, are, for example: diethanolamine, monoethanolamine, diisopropanolamine, isopropanolamine, diglycol amine (2-(2-aminoethoxy)ethanol), 3-amino-1-propanol and polyetheramines such as Polyetheramin D 2000 (BASF), Polyetheramin D 230 (BASF), Polyetheramin T 403 (BASF), Polyetheramin T 5000 (BASF) or corresponding Jeffamine grades from Huntsman.

Compounds according to the invention of the formula (I) with x=1 can also be commercially available amides having OH or NH functions, for example from Evonik Goldschmidt: Rewomid® DC 212 S, Rewomid® DO 280 SE, Rewocid® DU 185 SE, Rewolub® KSM, REWOMID® C 212, REWOMID® IPP 240, REWOMID® SPA, Rewopon® IM AO, Rewopon® IM AN or Rewopon® IM R 40, and also DREWPLAST® 154, NINOL® 1301, NINOL® 40-CO, NINOL® 1281, NINOL® COMF, NINOL® M-10 and ethoxylated diethanolamides such as NINOL® C-4 1, NINOL® C-5, NINOL® 1301 of Stepan or DACAMID® MAL and DACAMID® DC from Sasol. A preferred amide is, in particular, Cocoamid DEA.

In a preferred embodiment of the invention, the amidation is carried out using a substochiometric amount of amine, so that very little or no free amine is present in the end product. Since amines generally have disadvantageous toxicological properties because of their irritant or corrosive effect, minimization of the amine contents is desirable and advantageous. The proportions of amine in the mixture used according to the invention, in particular the proportions of compounds bearing primary and secondary amine groups, are preferably less than 5% by weight, particularly preferably less than 3% by weight, in particular less than 1% by weight, based on the sum of amines and amides.

As surfactants TD in the composition of the invention, particular preference is given to those of the formula (I) in which x=0 and Y=NR$^1$R$^2$ or Y=O—R$^1$ and m=0, with R$^1$ and R$^2$ as described above, very particularly preferably Cocoamid DEA, isotridecanol or isononanol.

The composition of the invention contains one or more polyols. The polyol component is preferably different from the surfactants TD present in the composition. Polyols suitable for the purposes of the present invention are all organic substances having a plurality of isocyanate-reactive groups, and also preparations thereof. Preferred polyols are all polyether polyols and polyester polyols customarily used for producing polyurethane foams. Polyether polyols are obtained by reacting polyfunctional alcohols or amines with alkylene oxides. Polyester polyols are based on esters of polybasic carboxylic acids (usually phthalic acid or terephthalic acid) with polyhydric alcohols (usually glycols). The properties demanded of the foams predicate the use of appropriate polyols as described for example in: US 2007/0072951 A1, WO 2007/111828 A2, US 2007/0238800, U.S. Pat. No. 6,359,022 B1 or WO 96 12759 A2. Preferred vegetable oil-based polyols are likewise described in various patent documents, for example in WO 2006/094227, WO 2004/096882, US 2002/0103091, WO 2006/116456 and EP 1 678 232.

The composition of the invention preferably contains at least one physical blowing agent, i.e. a volatile (boiling point below 100° C., preferably below 70° C.) liquid or a gas based on an unsaturated halogenated hydrocarbon, preferably unsaturated fluorinated hydrocarbon and/or chlorofluorohydrocarbon. Preferred unsaturated halogenated hydrocarbons are trans-1,3,3,3-tetrafluoro-1-propene (HFO-1234zeE), 2,3,3,3-tetrafluoro-1-propene (HFO-1234yf), cis-1,1,1,4,4,4-hexafluoro-2-butene (HFO-1336mzzZ), trans-1,1,1,4,4,4-hexafluoro-2-butene (HFO-1336mzzE) and trans-1-chloro-3,3,3-trifluoro-1-propene (HFO-1233zd-E). The HFO blowing agent can optionally be combined with further physical co-blowing agents, where these are preferably not hydrocarbons. Preferred co-blowing agents are, for example, saturated or unsaturated fluorinated hydrocarbons, particularly preferably 1,1,1,2-tetrafluoroethane (HFC-134a), 1,1,1,3,3-pentafluoropropane (HFC-245fa), 1,1,1,3,3-pentafluorobutane (HFC-365mfc), 1,1,1,2,3,3,3-heptafluoropropane (HFC-227ea) 1,1-difluoroethane (HFC-152a), saturated chlorofluorohydrocarbons, particularly preferably 1,1-dichloro-1-fluoroethane (HCFC-141b), oxygen-containing compounds, particularly preferably methyl formate or dimethoxymethane, or chlorinated hydrocarbons, particularly preferably 1,2-dichloroethane, or mixtures of these blowing agents.

Particularly preferred compositions of the invention do not have any hydrocarbons such as n-pentane, isopentane or cyclopentane as physical blowing agents.

The preferred amounts of physical blowing agent depend entirely on the desired density of the foam to be produced and are typically in the range from 5 to 40 parts by mass based on 100 parts by mass of polyol.

Apart from physical blowing agents, chemical blowing agents which react with isocyanates to evolve gas, for example water or formic acid, can also be present.

As foam stabilizer, the composition of the invention contains at least one silicon-containing foam stabilizer which is different from the surfactants TD. Preferred silicon-containing foam stabilizers are organic polyether siloxanes, e.g. polyether-polydimethylsiloxane copolymers. Typical amounts of silicon-containing foam stabilizers used are from 0.5 to 5 parts by mass per 100 parts by mass of polyol, preferably from 1 to 3 parts by mass per 100 parts by mass of polyol. Suitable silicon-containing foam stabilizers are described, for example, in EP 1873209, EP 1544235, DE 10 2004 001 408, EP 0839852, WO 2005/118668, US 20070072951, DE 2533074, EP 1537159, EP 533202, U.S. Pat. No. 3,933,695, EP 0780414, DE 4239054, DE 4229402 and EP 867464 and are marketed, for example, under the trade name Tegostab® by Evonik Industries. The preparation of the siloxanes can be carried out as described in the prior art. Particularly suitable examples for the preparation are described, for example, in U.S. Pat. No. 4,147,847, EP 0493836 and U.S. Pat. No. 4,855,379.

In addition, the compositions of the invention can contain further components such as further foam stabilizers, catalysts, crosslinkers, flame retardants, fillers, dyes, antioxidants and thickeners/rheology additives. These further components are preferably not surfactants TD and differ from these.

As catalyst which catalyzes the formation of a urethane or isocyanurate bond, the composition of the invention preferably comprises one or more catalysts suitable for the reactions of isocyanate-polyol and/or isocyanate-water and/or isocyanate trimerization. Suitable catalysts for the purposes of the present invention are preferably catalysts which catalyze the gel reaction (isocyanate-polyol), the blowing reaction (isocyanate-water) and/or the dimerization or trimerization of the isocyanate. Typical examples of suitable catalysts are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol and bis(dimethylaminoethyl) ether, tin compounds such as dibutyltin dilaurate and potassium salts such as potassium acetate and potassium 2-ethylhexanoate. Suitable catalysts are, for example, mentioned in EP 1985642, EP 1985644, EP 1977825, US 2008/0234402, EP 0656382 B1, US 2007/0282026 A1 and the patent documents cited therein.

Preferred amounts of catalysts present in the composition of the invention depend on the type of catalyst and are usually in the range from 0.05 to 5 pphp (=parts by mass based on 100 parts by mass of polyol) or from 0.1 to 10 pphp in the case of potassium salts.

As flame retardant, the composition of the invention can comprise all known flame retardants which are suitable for producing polyurethane foams. Suitable flame retardants for the purposes of the present invention are preferably liquid organophosphorus compounds such as halogen-free organophosphates, e.g. triethyl phosphate (TEP), halogenated phosphates, e.g. tris(1-chloro-2-propyl) phosphate (TCPP) and tris(2-chloroethyl) phosphate (TCEP), and organic phosphonates, e.g. dimethyl methanephosphonate (DMMP), dimethyl propanephosphonate (DMPP), or solids such as ammonium polyphosphate (APP) and red phosphorus. Furthermore, halogenated compounds, for example halogenated polyols, and solids such as expandable graphite and melamine are suitable as flame retardants.

Further components known from the prior art, e.g. polyethers, nonylphenol ethoxylates or non-ionic surfactants which are all not surfactants according to the definition of the surfactants TD can optionally also be present as further additives in the composition.

The compositions of the invention can be used, for example, for producing polyurethane foams, in particular rigid polyurethane foams. In particular, the compositions of the invention can be used in a process according to the invention for producing polyurethane or polyisocyanurate foams (polyurethane foams), in particular for producing rigid polyurethane foams which are characterized in that a composition according to the invention is reacted. For this purpose, a composition according to the invention which contains an isocyanate component or one of the compositions according to the invention to which an isocyanate component has been added is reacted, in particular foamed.

As isocyanate component, it is possible to use all isocyanate compounds which are suitable for producing polyurethane foams, in particular rigid polyurethane or polyisocyanurate foams. The isocyanate component preferably comprises one or more organic isocyanates having two or more isocyanate functions. Suitable isocyanates for the purposes of this invention include for example any polyfunctional organic isocyanates, for example 4,4'-diphenylmethane diisocyanate (MDI), toluene diisocyanate (TDI), hexamethylene diisocyanate (HMDI) and isophorone diisocyanate (IPDI). The mixture of MDI and more highly condensed analogues having an average functionality of 2 to 4 which is known as "polymeric MDI" ("crude MDI") is particularly suitable. Examples of suitable isocyanates are mentioned in EP 1 712 578 A1, EP 1 161 474, WO 058383 A1, US 2007/0072951 A1, EP 1 678 232 A2 and WO 2005/085310.

The ratio of isocyanate to polyol, expressed as index, is preferably in the range from 40 to 500, preferably from 100 to 350. The index describes the ratio of isocyanate actually used to calculated isocyanate (for a stochiometric reaction with polyol). An index of 100 represents a molar ratio of 1:1 for the reactive groups.

The process of the invention for producing polyurethane foams, in particular rigid polyurethane foams, can be carried out by known methods, for example by manual mixing or preferably by means of foaming machines. If the process is carried out by means of foaming machines, high-pressure or low-pressure machines can be used. The process of the invention can be carried out batchwise or continuously.

A summary of the prior art, the raw materials which can be used and processes which can be used may be found in "Ullmann's Encyclopedia of Industrial Chemistry" Vol. A21, VCH, Weinheim, 4th Edition, 1992, pp. 665 to 715.

The use of the composition of the invention in the production of rigid polyurethane foams makes it possible to obtain the polyurethane foams of the invention.

A preferred rigid polyurethane or polyisocyanurate foam formulation according to the present invention would give a foam density of from 20 to 150 kg/m$^3$ and preferably has the composition shown in Table 2.

TABLE 2

Composition of a rigid polyurethane or polyisocyanurate formulation

| Component | Parts by weight |
|---|---|
| Polyol | 100 |
| Amine catalyst | 0.05 to 5 |
| Potassium trimerization catalyst | 0 to 10 |
| Surfactants TD | 0.05 to 20 |
| Water | 0.1 to 20 |
| HFO blowing agents | 1 to 40 |
| Flame retardant | 0 to 50 |
| Isocyanate index: From 80 to 500 | |

Polyurethane foams according to the invention, in particular rigid polyurethane foams, are also characterized in that they are obtainable via the process of the invention.

Preferred polyurethane foams according to the invention, in particular rigid polyurethane foams, which have been produced using the composition of the invention have a thermal conductivity measured in the fresh (i.e. cured for 24 h at room temperature) state at 23° C. of less than 21 mW/m·K, preferably less than 20 mW/m·K (determined by means of a 2-plate thermal conductivity measuring instrument "Lambda Control" from Hesto).

The polyurethane foams according to the invention (polyurethane or polyisocyanurate foams), in particular rigid polyurethane foams, can be used as or for producing insulation materials, preferably insulation boards, refrigerators, insulating foams or spray foams.

Cooling apparatuses according to the invention are characterized in that they have a polyurethane foam according to the invention (polyurethane or polyisocyanurate foam), in particular rigid polyurethane foam, as insulation material.

The examples listed below illustrate the present invention by way of example, without any intention of restricting the invention, the scope of application of which is apparent from the entirety of the description and the claims, to the embodiments specified in the examples.

EXAMPLES

Comparative Example 1

To provide a foamable A component, 72.0 parts by weight (pbw) of a polyol A (containing an aliphatic polyether polyol and an MDA-initiated polyether polyol, 2.3 parts by weight of water and a mixture of the amine catalysts DMCHA and PMDETA) were mixed with 24.5 parts of the HFO blowing agent trans-1-chloro-3,3,3-trifluoro-1-propene (HFO-1233zd-E), obtainable under the trade name Solsitce LBA (Honeywell). In addition, 4 parts of various polyether siloxane-based foam stabilizers, obtainable as TEGOSTAB® BXXXX grades from Evonik Industries AG, were mixed with this mixture. The precise composition of this mixture is shown in Table 3.

TABLE 3

Composition of foamable A components based on the polyol A and the HFO blowing agent 1233zd

| Sample | Polyol A | Solsitce LBA | Stabilizer |
|---|---|---|---|
| A1 | 72.0 pbw | 24.5 pbw | B8465 - 4.0 pbw |
| A2 | 72.0 pbw | 24.5 pbw | B8481 - 4.0 pbw |
| A3 | 72.0 pbw | 24.5 pbw | B8491 - 4.0 pbw |

After homogenizing by manual stirring, significant turbidity was observed in all samples. In addition, macroscopic phase separation of the samples could be observed after a few days.

Example 1 According to the Invention

To compatibilize the A components described in Comparative Example 1, isotridecanol (BASF SE) or Cocoamid DEA (diethanolamide) Rewomid® DC212 S from Evonik Industries AG was additionally mixed as surfactant into the samples. The precise composition of the resulting mixture is shown in Table 4. After homogenization, clear, optically isotropic samples which did not display phase separation even after a prolonged period of storage were obtained in all cases.

TABLE 4

Composition of surfactant-containing foamable A components based on the polyol A and the HFO blowing agent 1233zd-E

| Sample | Polyol A | Solsitce LBA | Stabilizer | Surfactant TD |
|---|---|---|---|---|
| A4 | 72.0 pbw | 24.5 pbw | B8465 - 4.0 pbw | Isotridecanol - 3.0 pbw |
| A5 | 72.0 pbw | 24.5 pbw | B8465 - 4.0 pbw | Cocoamid DEA - 7.0 pbw |
| A6 | 72.0 pbw | 24.5 pbw | B8481 - 4.0 pbw | Isotridecanol - 6.0 pbw |
| A7 | 72.0 pbw | 24.5 pbw | B8481 - 4.0 pbw | Cocoamid DEA - 10.0 pbw |
| A8 | 72.0 pbw | 24.5 pbw | B8491 - 4.0 pbw | Isotridecanol - 1.0 pbw |
| A9 | 72.0 pbw | 24.5 pbw | B8491 - 4.0 pbw | Cocoamid DEA - 1.0 pbw |

Comparative Example 2

To provide a foamable A component, 74.0 parts by weight (pbw) of a polyol B (containing an aliphatic polyether polyol and a phthalic anhydride-based polyester polyol, 2.4 parts by weight of water and a mixture of the amine catalysts DMCHA and PMDETA) were mixed with 24.0 parts of the HFO blowing agent Solsitce LBA (Honeywell). In addition, 3 parts of a polyether siloxane-based foam stabilizer were mixed into this mixture. The precise composition of this mixture is shown in Table 5.

TABLE 5

Composition of foamable A components based on the polyol B and the HFO blowing agent 1233zd

| Sample | Polyol A | Solsitce LBA | Stabilizer |
|---|---|---|---|
| A10 | 74.0 pbw | 24.0 pbw | B8465 - 3.0 pbw |
| A11 | 74.0 pbw | 24.0 pbw | B8481 - 3.0 pbw |
| A12 | 74.0 pbw | 24.0 pbw | B8491 - 3.0 pbw |

After homogenization, significant turbidity was found in all samples. In addition, macroscopic phase separation of the samples could be observed after a few days.

Example 2 According to the Invention

To compatibilize the A components described in Comparative Example 2, isotridecanol or Cocoamid DEA (diethanolamide) was additionally mixed as surfactant TD into the samples. The precise composition of the resulting mixture is shown in Table 6.

TABLE 6

Composition of surfactant-containing foamable A components based on the polyol A and the HFO blowing agent 1233zd

| Sample | Polyol A | Solsitce LBA | Stabilizer | Surfactant TD |
|---|---|---|---|---|
| A4 | 74.0 pbw | 24.0 pbw | B8465 - 4.0 pbw | Isotridecanol - 0.5 pbw |
| A5 | 74.0 pbw | 24.0 pbw | B8465 - 4.0 pbw | Cocoamid DEA - 0.5 pbw |
| A6 | 74.0 pbw | 24.0 pbw | B8481 - 4.0 pbw | Isotridecanol - 4.0 pbw |
| A7 | 74.0 pbw | 24.0 pbw | B8481 - 4.0 pbw | Cocoamid DEA - 3.0 pbw |
| A8 | 74.0 pbw | 24.0 pbw | B8491 - 4.0 pbw | Isotridecanol - 0.5 pbw |
| A9 | 74.0 pbw | 24.0 pbw | B8491 - 4.0 pbw | Cocoamid DEA - 0.5 pbw |

After homogenization, clear, optically isotropic samples which did not display phase separation even after a prolonged storage time were obtained in all cases.

The invention claimed is:

1. A composition which is suitable for producing polyurethane foams and contains at least one polyol component, at least one blowing agent, a catalyst which catalyzes the formation of a urethane or isocyanurate bond, a silicon-containing foam stabilizer and optionally further additives and optionally an isocyanate component, wherein the composition comprises at least one unsaturated halogenated hydrocarbon as blowing agent and at least one surfactant TD which does not have a silicon atom and has an HLB of less than 10, where the proportion of the sum of the surfactants TD in the composition is from 0.05 to 20 parts by mass per 100 parts by mass of polyol component and wherein the surfactant TD is selected from the group consisting of cocamide diethanolamide (DEA), isotridecanol or isonomanol.

2. The composition according to claim 1, wherein at least one compound selected from the group consisting of trans-1,3,3,3-tetrafluoro-1-propene (HFO-1234zeE), 2,3,3,3-tetrafluoro-1-propene (HFO-1234yf), cis-1,1,1,4,4,4-hexafluoro-2-butene (HFO-1336mzzZ), trans-1,1,1,4,4,4-hexafluoro-2-butene (HFO-1336mzzE) and trans-1-chloro-3,3,3-trifluoro-1-propene (HFO-1233zd-E) is present as unsaturated halogenated hydrocarbon.

3. The composition according to claim 1, wherein the composition comprises at least one isocyanate component.

4. A process for producing polyurethane or polyisocyanurate foams by reaction of a composition according to claim 1.

5. A process for producing polyurethane or polyisocyanurate foams (polyurethane foams) by reaction of a composition according to claim 2.

6. A process for producing polyurethane or polyisocyanurate foams (polyurethane foams) by reaction of a composition according to claim 3.

7. The composition according to claim 1, wherein the catalyst is selected from the group consisting of an amine, a tin compound, or potassium salt.

8. The composition according to claim 1, wherein the catalyst is selected from the group consisting of triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol, bis(dimethylaminoethyl) ether, dibutyltin dilaurate, potassium acetate or potassium 2-ethylhexanoate.

9. The composition according to claim 1, wherein the catalyst is selected from the group consisting of triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol or bis(dimethylaminoethyl) ether.

10. The composition according to claim 1, wherein the catalyst comprises dimethylcyclohexylamine.

11. The composition according to claim 1, wherein the catalyst comprises a mixture of dimethylcyclohexylamine and pentamethyldiethylenetriamine.

12. The composition according to claim 1, wherein the range of the catalyst is from 0.05 to 10 parts by mass based on 100 parts by mass of polyol (pphp).

13. The composition according to claim 1, wherein the range of the catalyst is from 0.05 to 5 parts by mass based on 100 parts by mass of polyol (pphp).

14. The composition according to claim 1, wherein the surfactant TD is selected from the group consisting of cocamide diethanolamide (DEA) or isotridecanol.

* * * * *